United States Patent Office
3,055,729
Patented Sept. 25, 1962

3,055,729
PROCESS FOR PRODUCING ION-EXCHANGE
FIBERS, FILMS, AND THE LIKE
George A. Richter, Jr., Abington, Charles H. McBurney, Meadowbrook, and Benjamin B. Kine, Levittown, Pa., assignors to Rohm & Haas Company, Philadelphia, Pa., a corporation of Delaware
No Drawing. Filed May 14, 1959, Ser. No. 813,080
9 Claims. (Cl. 18—54)

This invention relates to a new and improved process for producing ion-exchange fibers, films, and the like, having at least one small dimension of the order of one-tenth to twenty mils. This application is a continuation-in-part of our copending application Serial No. 587,925, filed May 29, 1956, now U.S. Patent 2,933,460.

The general procedure of the present invention is represented by the following flow-sheet:

---

Form into a film or filament, a water-insoluble linear addition polymer containing cross-linkable units and units convertible into cation-exchange groups.

---

|

Stretch.

|

---

React cross-linkable units to cross-link polymer molecules while maintaining in stretched condition.

|

---

React convertible units to form units containing cation-exchange groups.

---

Fibers of linear polymers containing ion-exchange groups are known. For example, cotton has been converted to sulfethoxy cellulose, carboxymethylated cellulose, phosphorylated cotton, and the like; but such modified cottons have low exchange capacities of the order of about 0.3 to about 1 milliequivalent (hereinafter abbreviated meq.) per gram. The proportion of ion-exchange groups that may be introduced into cotton is limited by the water-sensitivity imparted thereby. As greater proportions of such ion-exchange groups, necessarily of hydrophilic character, are introduced, the fibers lose their form and their strength, so that they end up as masses which are essentially no different from granular masses of ion-exchange resins when large proportions of ion-exchange groups are incorporated.

It is an object of the present invention to provide an improved process to produce filmy structures, within which term it is meant to include fibers, filaments, or pellicles, and films having at least one small dimension, formed substantially entirely of crosslinked polymeric materials, at least those polymer molecules at the surface of the structure having in the polymer molecule cation-exchange groups. Ion-exchange fibers of cross-linked structure obtained in accordance with the present invention may possess a wide range of ion-exchange capacity, all the way from relatively low values of 0.3 to 1 or more where low capacities are desired up to relatively high capacities of 6 to 8 meq. per gram. It is an object of the present invention to provide an improved process to produce stretched filmy structures of crosslinked polymers containing cation-exchange groups in which the polymers shown an appreciable orientation of linear portions of the polymeric chains in a direction other than that of the small dimension. Such oriented fibers are obtained by procedures involving a stretching of the fibers or filaments longitudinally, wherein orientation in the direction of the axis of the fiber is produced, or by stretching a film or pellicle longitudinally or widthwise or both to orient linear portions of the polymer molecules in the direction of either or both of these directions of the film or pellicle. Such stretched or oriented materials generally have improved tensile strengths as compared to the unoriented filmy structures. It is a further object of the invention to provide an improved process to produce filmy structures of crosslinked polymers containing cation-exchange groups which are of adequate strength to be converted by means of normal industrial and textile procedures into felt-like mats, such as by carding, or into textile structures of woven, knitted, or other construction. Further objects and advantages of the invention will appear hereinafter.

The product of the process of the present invention is a structure having at least one small dimension of the order of one-tenth to twenty mils and comprising a crosslinked product of a linear addition polymer, at least 7 mole percent of the units of the product containing cation-exchange groups, and at least 0.5 mole percent of the units derived from the initial linear polymer molecules being attached to units derived from other initial polymer molecules to provide crosslinks in the product. As many as 30 to 50 mole percent of the units of the initial linear polymer molecules may be attached in crosslinked manner to the units of other initial polymer molecules, but for most purposes the polymers contain from 1 to 20 mole percent of crosslinking units to assure adequate insolubility and limited swelling.

In accordance with the process of the present invention, there is first obtained or produced a linear addition polymer containing within the polymer units which are adapted to be cross-linked, which will hereinafter be termed "crosslinkable units," and units which contain groups that are adapted to be converted by subsequent treatment into cation-exchange groups. These units as will appear hereinafter may be one and the same so that it is within the scope of the invention to start with certain homopolymers. On the other hand, the more frequent and generally preferred situation is that in which the units adapted to be converted into cation-exchange units are different from the units which are adapted to serve as crosslinking units. Examples of cation-exchange groups include carboxyl groups, sulfonic acid groups, phosphoric acid groups, and thiol groups.

For convenience, the term "spinning" is used in a broad sense to include not only the conversion of the polymeric material, either in molten form or as a dispersion or solution, into the form of filaments and fibers, but also the formation of films, pellicles, or sheets from such polymer masses, such as by extrusion through an elongated orifice, slit, or slot.

The linear polymers containing the units specified are formed into fibers, films, or the like, by procedures more completely described hereinafter. After formation of the filmy structure, the linear polymers are converted into crosslinked structures. If desired, the linear polymers may be oriented in the direction of at least one long dimension of the structure by stretching before the crosslinking is effected so that crosslinking serves to fix within the structure the oriented condition of linear portions of the ultimate crosslinked polymer molecules within the structure. The modification of the linear polymer to introduce the ion-exchange groups is performed after the crosslinking.

The process of the present invention avoids the difficulties of spinning a water-soluble polymer as well as those associated with the handling of a fiber or film in water-soluble or extremely water-swellable condition. By first stretching the formed polymer while it is still relatively insensitive to water and then crosslinking it, the fiber or film is stabilized in its oriented condition of high tenacity. In this stabilized or crosslinked condition, the precursory units can be converted to cation-exchange units in aqueous media without excessive shrinkage or loss of strength even though the very introduction of the ion-exchanging groups may impart substantial water-sensitivity and water-swellability.

In accordance with the invention, the linear polymer to be spun is formed by copolymerization of (1) monomers containing groups adapted to be converted after formation of the fiber into cation-exchange groups with (2) monomers which provide units adapted to be crosslinked after formation of the fiber. The linear addition polymer is preferably a copolymer of 7 to 80 mole percent of units containing groups adapted to be converted into cation-exchange groups and at least one mole percent of units adapted to serve in crosslinking.

The monomers which provide the crosslinkable units in the copolymer include glycidyl acrylate and methacrylate; unreidoalkyl esters, such as ureidoethyl acrylate and methacrylate; ureidoethyl vinyl ether, ureidopentyl vinyl ether; ureidoisobutyl vinyl ether; N-vinyloxyalkyl carbamates, such as N-$\beta$-vinyloxyethyl carbamate; acrylamides; methacrylamides; N-mono-substituted acrylamides and methacrylamides, such as acrylamide per se, methacrylamide per se, N-methyl- or N-ethyl acrylamide or methacrylamide; hydroxyethyl vinyl ether or sulfide; hydroxypentyl vinyl ether or sulfide; 2-isocyanato vinyl ethers, such as 2-isocyanato-2,2-dimethylethylvinyl ether; aminoalkyl acrylates and methacrylates, such as aminoethyl acrylate, dimethylaminoethyl acrylate and N-dimethylaminoethyl acrylamide; alkoxymethyl vinyl sulfides, such as methoxymethyl vinyl sulfides; alkoxymethyl thioalkyl acrylates; methacrylates; and itaconates, such as methoxymethylthioethyl acrylate. In general, the crosslinkage monomer is a monoethylenically unsaturated compound containing a reactive substituent, such as carboxyl, hydroxyl, amido, amino, epoxy, isocyanato, or ureido groups, and the like.

The units which are adapted to be converted to cation-exchange units may be called precursory units. Examples of precursory units include those obtained from acrylonitrile and esters of monoethylenically unsaturated acids, such as the acrylates, methacrylates and itaconates of alcohols having from 1 to 18 carbon atoms, such as ethanol, methanol, isopropanol, hexanol, octanol, dodecanol, octanol, and benzyl alcohol. Acrylamide, methacrylamide, or N-substituted acrylamides or methacrylamides may also be used. All of these groups, including the acrylonitrile, the esters and the amides, are hydrolyzable to produce carboxyl units having cation-exchange capacities. Styrene, vinyl toluene, vinyl naphthalene, and related vinyl aromatic compounds also provide precursory units which may be converted by sulfonation or phosphorylation into cation-exchange groups. Homopolymers of alkoxymethyl vinyl sulfides of Formula I are convertible by hydrolysis into thiol units and, if desired, still further converted to sulfonic acid units. Similarly, homopolymers of alkoxymethylthioalkyl esters, such as the acrylates, methacrylates, or itaconates, may be used as precursory units adapted to provide groups which can be converted by hydrolysis into cation-exchange groups, either thiol or sulfonic acid.

Besides units containing crosslinkable functionality and units containing groups adapted to be converted into cation-exchange groups, the copolymer may contain other units that serve neither of these purposes. Such additional monomer units may be termed inactive units. Examples of such units include vinyl chloride; vinyl esters of organic acids, such as acetic, butyric, propionic, lauric, and so on, acids; ethylene; isobutylene; styrene; vinyltoluene; acrylonitrile; methacrylonitrile; vinylidene chloride; vinyl ethers, such as methyl vinyl ether; and so on.

The copolymers of these various units may be produced by bulk, solution, emulsion, or suspension procedures. In the coplymerization, the usual initiators or catalysts may be used, of which the following are typical: $\alpha,\alpha'$-bis-azoisobutyronitrile, dimethyl azobisisobutyrate, 2,2'-azobis-2,4-dimethylvaleronitrile, benzoyl peroxide, acetyl peroxide, lauroyl peroxide, tert-butyl hydroperoxide, di-tert-butyl peroxide, tert-butyl perbenzoate, stearoyl peroxide, cumene hydroperoxide, and "per-salts" such as ammonium persulfate and ammonium perborate. The catalysts are used in amounts from 0.2 to 5%, and preferably from 0.5 to 2%, based on the weight of the polymerizable compound or compounds.

The polymerization may be effected at temperatures from about room temperature up to about 100° C. for periods of time ranging from a few minutes to several hours. In producing aqueous emulsion copolymer dispersions, any of the initiators above may be used; but it is generally preferable to use ammonium, sodium, or potassium persulfate in conjunction with a reducing agent, such as a sulfite, bisulfite, methabisulfite, or hydrosulfite of an alkali metal, to provide a redox system. The addition of a few parts per million of a polyvalent metal, such as iron, may also be used in the emulsion polymerization procedure. The monomer or mixture of monomers may be added gradually or in successive increments at spaced intervals through the polymerization; or the entire monomer or monomer mixture may be polymerized as a single batch, regardless of which polymerizing system or technique is employed.

As emulsifiers when emulsion polymerization is employed, there may be used any of the conventional anionic, cationic, or non-ionic emulsifiers, such as fatty acid soaps, including sodium oleate, sodium laurate, sodium stearate, and so on, also sodium dodecylsulfate or sulfonate, sodium pentadecylbenzenesulfonate, sodium octylphenoxyethoxyethylsulfonate, octylphenoxypolyethoxyethanol, tetradecylthiopolyethoxyethanol, ethylene oxide condensates of tall oil and other long-chained fatty acids, lauryldimethylbenzylammonium chloride, dodecylbenzyltrimethylammonium chloride, or any of the many wetting agents and emulsifiers which are generally advocated for forming aqueous emulsions. Some emulsifiers are better for handling a given monomer or a mixture of monomers than others.

The product obtained by bulk polymerization may be directly used in a melt-spinning; or the polymeric product thereby obtained may be dissolved in a suitable organic solvent in which it is soluble; and the dissolved polymer may be spun either by a wet or a dry system, using as coagulants in the wet-spinning, aqueous media or organic solvents in which the polymer is insoluble but in which the solvent of the spinning solution is soluble. The product obtained by solution polymerization may be directly wet- or dry-spun, or the polymer thereof may be precipitated or in some other manner coagulated and dissolved in another solvent to prepare a spinning solution. The precipitated or coagulated polymer may also be spun by melt-spinning if desired. Similarly, the product obtained by suspension polymerization may be recovered and used in melt-spinning or dissolved in a suitable solvent and either wet- or dry-spun. The aqueous dispersions obtained by emulsion polymerization may be directly spun either by a wet- or a dry-spinning system, or the polymer therein may be coagulated and then spun by a melt-spinning operation or by a wet- or dry-spinning operation.

The spinning of the polymer mass, either as a molten polymer or as a solution or dispersion thereof, is then carried out, as more particularly described hereinafter, to form films, filaments, fibers or pellicles, or the like; and, after the formation of such structures, treatment is carried out to effect the crosslinking of the polymer. If stretching is employed, substantially all of the crosslinking should be effected after the stretching. The particular crosslinking procedure employed depends upon the components of the polymer constituting the fiber or film.

When the polymer contains epoxy groups, as in the case of copolymers of glycidyl acrylate or methacrylate, the cross-linking may be effected simply by heating the structure, such as from 60° to 250° C., the upper limit being dependent upon the other comonomers present and being insufficiently high to destroy the film or fiber structure. The time generally used is inversely proportional to the temperature. For example, a period of a few seconds to 15 seconds may be proper in the upper regions of the temperature range given, whereas a period of time of a half an hour to several days may be desirable at lower temperatures in the range cited. This crosslinking by heat may be accelerated by simultaneous treatment with 0.5 to 1%, by weight of the polymer structure, of a catalyst, such as p-toluenesulfonic acid, sulfuric acid, phosphoric acid, aluminum chloride, and the like.

Instead of relying upon heat with or without a catalyst or accelerator, the epoxy groups in such polymers may be reacted with polyamines containing at least two primary, secondary, or tertiary amine nitrogen atoms. It is believed that the crosslinking action obtained with the polyamines when they contain tertiary amine nitrogen groups is attributable to quaternization. The temperatures and times may fall within the ranges of temperature and time given when heat alone is employed. The diamine may be applied in a solvent, such as water, at a concentration of 5 to 10%; but, when it is a liquid, it may be applied directly without dilution in a solvent. The filmy structure may be impregnated with the diamine by simple immersion or by spraying, or in any other suitable manner. Examples of polyamines include ethylenediamine, diethylenetriamine, triethylenetetramine, hexamethylenediamine, N,N'-dimethyl-ethylenediamine, N,N,N',N'-tetramethylethylenediamine, N,N,N',N'-tetraethyl-ethylenediamine, and N,N,N',N'-tetraethyl-hexamethylenediamine.

When the crosslinkable units of the polymer contain ureido or carbamato groups or linkages, crosslinking may be effected by heat alone as in the case of the polymers of glycidyl methacrylate, the temperatures and times being generally in the same ranges as given for the glycidyl-containing polymers. They also may be crosslinked by reaction with aldehydes, especially formaldehyde, or by urea or methylol derivatives of urea, such as dimethylol urea. For this purpose, the formaldehyde may be applied as a gas; or any aldehyde, including formaldehyde, or urea or derivatives of urea, may be applied from solutions in water or alcohol; and the impregnated structure is heated to effect crosslinking at temperatures ranging from 30° to 250° C. for times of the same general range as outlined hereinabove in respect to the heating of polymers of glycidyl acrylates. Besides aldehydes, polyisocyanates or polyisothiocyanates, such as toluene-2,4-diisocyanate, hexamethylene-diisocyanate, and the like, may be used for effecting crosslinking. With them, temperatures from room temperature or lower down to about 0° C. or higher up to 250° C. may be employed, depending upon the particular polyisocyanate and the particular polymer. The times may be as above, in any case the time employed being sufficient to give the desired crosslinking.

When the crosslinkable groups in the polymer are isocyanate groups, the crosslinking may be effected by any compound having at least two reactive hydrogen atoms, including aldehydes, polyamines, such as those mentioned hereinabove for crosslinking the polymers of glycidyl acrylates; polyhydric alcohols, such as glycols, including ethylene glycol, diethylene glycol, hexamethylene glycol, glycerol, sorbitol, sorbitan, and sorbide; polythiols, especially the dithiols such as ethylene dithiol, p-xylylene dithiol; polyhydroxyphenols, such as resorcinol; pyrocatechol; orcinol; tannic acid; polycarboxylic acids; and especially dicarboxylic acids, such as succinic acid, adipic acid, sebacic acid, o-phthalic acid, terephthalic acids; and so on. Treatment may be effected by immersion or spraying in the polyfunctional reactant, if it is a liquid or molten at the temperature employed, or by immersion or spraying of a solution of the polyfunctional reactant. The heating may be effected while the polymeric structure is immersed in the body of reagent; but preferably excess reagent is removed and the polymer structure is heated at temperatures from about 0° C. up to 100° C. or more, such as up to 200° C., for sufficient time to effect crosslinking which may amount to a few seconds at the high temperature up to an hour or more at the lower temperature of the range.

When the crosslinkable units in the polymeric structures contain amine groups, crosslinking may be effected by polycarboxylic acids or polyisocyanates, such as any of those mentioned above; and the reaction may be effected at the temperatures mentioned hereinabove. When the crosslinkable units contain amine groups having tertiary nitrogen atoms, such as diethylaminoethyl methacrylate, the crosslinking may be effected by quaternization by means of poly-halides and especially di-halides, including ethylene dichloride, xylylene dichloride, hexamethylene dichloride.

When the crosslinkable units contain hydroxyl groups, the crosslinking may be effected by means of aldehydes, such as formaldehyde, acetaldehyde, glyoxal, and the like, also aldehyde derivatives of urea, such as dimethylol urea, reaction being effected at temperatures of about 30° to 250° C. for periods of several hours at the lower temperature to a few seconds at the higher temperatures. Besides aldehydes and their derivatives, crosslinking may be effected by polyisocyanates or polyisothiocyanates, such as those mentioned hereinabove; polycarboxylic acids, such as those mentioned hereinabove; and by polybasic acid halides, such as succinoyl chloride, adipoyl chloride, and so on. These reactions may be effected within the temperature ranges mentioned hereinabove and in similar time periods.

The crosslinkable units of the polymer may consist of alkoxymethyl vinyl sulfide units, and especially methoxymethyl vinyl sulfide, which can be converted to thiol units by hydrolysis and the thiol units then converted to disulfide linkages by mild oxidation. The alkoxymethyl vinyl sulfide compounds that may be used as monomers have the structure of Formula I:

(I)          $CH_2=C(R)SR'OR''$

where R is selected from the group consisting of hydrogen and methyl; R' is a methylene, ethylidene or isopropylidene group; and R" is an alkyl group having 1 to 8 carbon atoms, but is preferably methyl.

Since part or all of the —R'—OR" portion of the compound is eliminated in the subsequent crosslinking, it is generally preferred to polymerize the simplest compound, namely, the methoxymethyl vinyl sulfide, in preparing the polymers to be used in making the fibers and films of the present invention. Generally, in making filmy products of the present invention, there may be used copolymers containing from 0.5 to 30 mole percent of the sulfide monomer and preferably between 5 and 20 mole percent thereof. It has been found that polymers containing the sulfide of Formula I are self-crosslinking when subjected to mild oxidation at elevated temperatures as will be described hereinbelow. Preparation of these monomers and of polymers containing them is disclosed in a United States patent of Jesse C. H. Hwa, 2,906,741, September 29, 1959, and the entire disclosure of that patent is incorporated herein by reference.

The hydrolysis to form thiol groups may be effected in acid solutions having concentrations of anywhere from about 0.25 to 25% or higher. When the coagulating bath used in wet-spinning techniques is an acid bath, it appears that at least some, if not all, of the hydrolysis can be effected at this stage. The oxidation requires mild oxidation agents only, such as the presence of air, or more conveniently the treatment with dilute solutions of at least about 0.25% of an oxidizing agent, such as an aqueous solution of hydrogen peroxide, chlorine, sodium hypochlorite, sodium hypoiodite (e.g., formed by dissolving iodine in aqueous sodium hydroxide at a pH of 10 or less), calcium hypochlorite, nitric acid, potassium permanganate, peracetic acid, performic acid, or potassium dichromate; or alcoholic solutions of iodine may be employed, such as a solution of at least 0.25 up to 25% or more iodine in methanol, ethanol, isopropanol, and so on.

The polymer product may be treated with a solution of the oxidizing agent at any temperature from room temperature up to about 80° C. or higher for various periods of time. For example, the treatment may be effected for about one-quarter of an hour to an hour at room temperature and for comparatively reduced periods of time from about 10 seconds to 15 minutes at about 80° C. Longer periods of time may be employed at any of the temperatures in the range mentioned: but, generally, the periods mentioned are adequate. The permissible upper limits of the conditions of temperature, time, and concentration depend on the individual oxidizing agent; and they are correlated to provide a mild oxidation which serves to effect crosslinking but does not go appreciably further to form substantial amounts of sulfone and sulfonic acid groups. The upper limit of concentration depends on the individual agent and the temperature at which the oxidation is carried out. If the temperature is kept low, such as at normal room temperatures, concentrations as high as 3 to 5%, or in some cases even up to 10 to 25%, may be employed without substantial conversion of the —SH groups to sulfones and/or sulfonic acids. At higher temperatures up to 50° to 80° C., the concentration of the stronger agents must be progressively lowered to avoid substantial conversion to sulfones and sulfonic acids. As explained later, partial oxidation to the sulfonic acid stage may be desired to provide cation-exchange groups in the polymer crosslinked through the disulfide linkages.

In many cases, it may be desirable to carry out the main part of the heating to effect the crosslinking after a relatively limited period of treatment in a solution of the oxidant which serves primarily to effect impregnation of the fiber, film, filament bundle, or the like, with the oxidant and may or may not serve to effect a portion of the desired crosslinking. The subsequent heating stage in such event may be termed a baking or curing step and may be carried out at temperatures of 50° to 200° C.; but, as discussed hereinbefore, the upper limit of temperature in this stage is dependent on the particular oxidant employed. In such cases, after removal of the polymer product from the medium containing the oxidizing agent, the excess of such medium may be removed as by suction, squeezing, or air-squeegeeing; and the oxidation which may or may not have been started while the polymer product is immersed in the medium containing the oxidizing agent may be pushed to completion by subsequently heating the polymer product at elevated temperatures from about 80° to 200° C. for a period of time ranging from about 5 minutes to about half an hour at the higher temperature to about 15 minutes to about an hour or two at the lower temperature.

The crosslinkable units of the polymer may consist of alkoxymethylthioalkyl acrylate, methacrylate, or itaconate units. These units are hydrolyzed to thiol groups in the same manner as the alkoxymethyl vinyl sulfide units hereinbefore described, and mild oxidation as described above serves to form disulfide linkages.

The polymers may be formed into structures having at least one small dimension, such as films, sheets, fibers, or filaments, by extrusion, either of a melt of the polymer, a solution thereof in an organic solvent, or an aqueous dispersion of a water-insoluble emulsion copolymer, through an extrusion device containing one or more orifices into a suitable coagulating medium which may be a cooling fluid, gaseous or liquid, in the case of melt-spinning; a heated atmosphere in the case of the dry-spinning of a solution or aqueous dispersion; or a coagulating liquid in the case of wet-spinning a solution or aqueous dispersion. Fibrous structures may also be formed by a spraying technique, and so-called "cocoon" protective coverings may also be formed by spraying.

In the melt-spinning of the polymers, provision is made for bringing the polymer mass, which may preferably be in a granular or pulverized form, into molten condition in proximity to the spinneret or other extrusion device. This is generally accomplished by providing a suitably heated chamber in proximity to the spinneret or other extrusion device and superimposing upon the molten mass suitable pressure for forcing the mass through the orifice or orifices of the device. In this procedure, when the polymer being spun contains groups such as alkoxymethylsulfide groups which tend to crosslink on oxidation, crosslinking can be avoided by maintaining an inert atmosphere (that is, excluding oxygen) in contact with the streams which issue from the extrusion device until after stretching is effected on the fibers or films, if stretching is desired. A cooled atmosphere of carbon dioxide, nitrogen, helium, or the like may be maintained within the space into which the molten polymer stream or streams is or are extruded. The temperature of the atmosphere may be from minus 50° to about 20° C. above zero.

Dry- and wet-spinning procedures may be employed with solutions of the polymers in organic solvents, such as acetone, dioxane, methyl ethyl ketone, methyl isobutyl ketone, dimethylformamide, dimethylacetamide, acetonitrile, nitromethane, nitroethane, and so on. The concentration of the copolymer in such solutions may be from about 15 to 25%. Similarly, aqueous dispersions of the water-insoluble copolymers made by emulsion copolymerization in aqueous media may be formed into fibers, films, and the like by either dry- or wet-spinning. The concentration of the copolymer in the aqueous dispersions may be from 20 to 70% in wet-spinning or from about 40 to 70% in dry-spinning. Preferably, a concentration of 30 to 50% is used in wet-spinning and about 50 to 55% in dry-spinning. In the dry-spinning of solutions or dispersions of the polymers, the stream or streams of the solution or dispersion issuing from the orifice or orifices of the extrusion device are generally subjected to a heated atmosphere immediately after issuance and for a considerable distance as they travel away from the extrusion device. This is generally effected in a chamber referred to as a spinning cell in which the heated atmosphere is introduced, either near the extrusion device when concurrent flow is desired or at the discharge end of the device when countercurrent flow is desired. The heated atmosphere may have a temperature within the cell ranging from about 30° up to 300° C. Generally, if the spinning solution used is made with a volatile organic solvent, the temperature may be in the lower portion of this range, such as from about 30° to 90° C.; whereas, when an aqueous solution or aqueous dispersion is being spun, higher temperatures are generally employed in the cell. Specifically, when spinning an aqueous dispersion of an emulsion copolymer, temperatures of 180° to 400° C. may be employed. In any event, if the filmy structure is formed of a polymer in which the crosslinkable units are self-crosslinking on heating, and it is desired to stretch the structure, excessive temperature or prolonged exposure thereto should be avoided during stretching to minimize crosslinking at this stage.

Generally, the formed structures are completely coalesced by the time they leave the spinning cell. However, in the event that the duration and intensity of heat treatment in the spinning cell is inadequate to completely coalesce the polymer particles within the formed structure when an aqueous copolymer dispersion is spun, an additional heating stage may be provided to complete the coalescence. This heating is performed at a temperature sufficiently high to carry the temperature of the shaped structure above the $T_i$ value (apparent second order transition temperature) of the copolymer and preferably at least about 30° C. above the $T_i$ value thereof.

The apparent second order transition temperature, here symbolized as $T_i$, is defined as that temperature at which the first derivative of thermodynamic variables, such as coefficient of expansion or heat capacity, undergoes a sudden change. The transition temperature is observed as an inflection temperature which is conveniently found by plotting the log of the modulus of rigidity against temperature. A suitable method for determining such modulus and transition temperature is described by Williamson in British Plastics 23, 87–90. The $T_i$ values here used are generally those temperatures at which the modulus is 300 kg./cm.² The $T_i$ values referred to are for polymers as such in a dry state unless otherwise designated.

The products, after leaving the spinning cell (whether dry-spinning, wet-spinning, or melt-spinning is used), may then be stretched to any extent desired, such as from about 5 to over 1000% of the length they have before stretching. Preferably at least 50% stretch is performed on the fiber.

In the wet-spinning of either solutions or aqueous dispersions of the copolymers, the liquid coagulating bath may be aqueous baths containing electrolytes, such as acids, alkalies, or salts. Generally, the electrolyte content should be from 5 to 50% and the temperature of the bath from about 20° to 105° C., preferably 30° to 45° C. However, when acid baths are used, much lower concentrations even as low as about 0.5% being effective to lower the pH to a value of 6 or less. Mixtures of the above electrolytes may be employed, such as an acid bath containing salts or an alkaline bath containing salts. Acid baths may be composed of aqueous solutions containing from 0.5 to 98% of an acid, such as sulfuric acid; or other inorganic acids, such as hydrochloric, phosphoric, boric, or sulfamic; or of organic acids, such as oxalic, formic, acetic, citric, lactic; or an alkanesulfonic acid or arylsulfonic acid, such as ethanesulfonic or toluenesulfonic acids. The bath may have a pH value from about 1 to 6 and preferably between 1½ and 4. The bath may contain, besides the acid, buffering salts such as sodium dihydrogen phosphate. The acid baths may also contain small amounts of polyvalent metal salts, such as sulfates, chlorides, or the like of iron (either ferrous or ferric), aluminum, zirconium, tin, cobalt, nickel, and zinc.

Alkaline baths may also be used as the coagulating baths for wet-spinning operations. The pH may be from 8 to 13 and is preferably at least 12 when aqueous dispersions of emulsion copolymers are used. To make up the alkaline baths, there may be used any water-soluble electrolytes or mixtures thereof, such as sodium chloride, lithium chloride, potassium chloride, sodium carbonate, sodium sulfate, sodium acetate, potassium sulfate, sodium or potassium formate; or sodium phosphates of various types, including complex phosphates; alkalies, such as sodium or potassium hydroxide; or mixtures of such electrolytes may be used. Alkalinity may also be supplied by a quaternary ammonium hydroxide, such as trimethylbenzylammonium hydroxide, hydroxyethyltrimethylammonium hydroxide, or dimethyldibenzylammonium hydroxide. Organic materials such as glucose and urea may also be present in the bath.

Acidic, neutral, or alkaline baths containing, as the major component of the solute, salts such as neutral, acidic, or basic salts may be employed. For example, a coagulating bath may be composed of aqueous solutions of sodium sulfate, sodium chloride, ammonium chloride, sodium carbonate, sodium bisulfite, sodium acetate, borax, aluminum chloride, and so on.

Wet-spinning may also be performed by extrusion of the solution or dispersion of the polymer into organic liquids which are non-solvents for the polymer but are solvents for the organic liquid used for dissolving the polymer to make the spinning solution.

The immersion of the filaments or films in the coagulating bath may vary from a fraction of an inch, such as from ¼ or ½ inch, to several feet, such as three to four feet or more. In wet-spinning, the filaments, after removal from the coagulating bath, may be treated with a neutralizing agent, such as an aqueous acid solution when an alkaline coagulating bath is used. Whether or not neutralization is first effected, rinsing may be effected such as with water or even with organic liquids, but preferably with water.

The spinneret or like extrusion device may be fed with the dispersion from a suitable feed- or supply-tank by a constant pressure or constant displacement method. This may be accomplished by the use of an oil ram operated either pneumatically, hydraulically, or mechanically. Where no harm is done when the dispersion is subjected directly to air pressure or to the pressure of a suitable gas, compressed air or gas may be introduced into the tank directly over the dispersion under the control of a suitable pressure regulating system in conventional manner. When the dispersions have satisfactory stability against mechanical shear, they may be fed to the spinnerets by suitable pumps and especially the conventional gear pumps which may be provided with the conventional by-pass for controlling the pressure.

The size of the orifices of the spinneret may be from about 0.5 to 10 mils or more up to 20 mils in diameter. For fine filaments, the usual size of orifices, namely 2.5 to 4 mils in diameter, may be used, whereas, for larger filaments, orifices having diameters of 5 to 9 mils may be used. Orifices of even larger size may be used to produce monofils; and, besides having a round cross-section, they may be of various cross-sections such as oval, elliptical, or of a rectangular slit or slot-like shape to produce ribbons or films of various widths.

The films or filaments may be withdrawn from the extrusion device at the same speed as the linear speed of extrusion or at a speed which is considerably higher or considerably less than the speed of extrusion. For example, the withdrawal speed may be used which is as low as 20% of the linear speed of extrusion or a speed of twice to three times the linear speed of extrusion. The speed of withdrawal may vary from one meter to 100 meters per minute or higher. When a film is produced, it may be wound on a mandrel after completion of the crosslinking operation and preferably after the crosslinked film has been dried. When filaments are produced, they may be collected by winding on a bobbin or on a centrifugal bucket or pot, the latter having the advantage of imparting a small amount of twist, such as from 1½ to 2½ turns per inch to the filament bundle or yarn when a multi-holed spinneret is used. Collection is preferably made after completion of the crosslinking and drying operations.

During the stretching of the filaments or films, they may be heated to temperatures of 70° to 300° C. by passage through a heated atmosphere or over a smooth heated plate such as of metal. The extent of stretch may be controlled such as by arranging the heated atmosphere or plate, through or over which the filaments or films pass, between a pair of wheels or godets which have the desired difference in speed so that the linear velocity of the filaments about the periphery of the second godet is a predetermined greater value from 50 to 1000% or more greater than the peripheral velocity of the first godet.

When an aqueous copolymer dispersion is spun, a fusion-aid may be employed. These materials may be introduced into the aqueous polymer dispersion either before emulsion polymerization of the monomers or after such polymerization. Compounds effective for this purpose have solubility in the polymer and have a favorable distribution coefficient in a polymer-water system. A copolymer of 70 parts of acrylonitrile, 5 parts of a crosslinking comonomer, and 25 parts of 3,3,5-trimethylcyclohexyl acrylate may be used with adiponitrile, α-methylsuccinonitrile, and nitromethane.

Also effective as fusion-aids for polymers formed in major proportion from acrylonitrile or methacrylonitrile are phenylacetonitrile, butyronitrile, hexanenitrile, α-methylsuccinonitrile, acrylonitrile, or methacrylonitrile monomers, endomethylenetetrahydrobenzonitrile, succinonitrile, benzonitrile, isobutyronitrile, and furonitrile.

Toluene, xylene, chlorinated hydrocarbons, such as chloroform and ethylene dichloride, ethyl acetate and butyl acetate are useful fusion-aids for copolymers of 80% methyl methacrylate, 13% of ethyl acrylate, and 7% of a crosslinking comonomer. From 1 to 40% by weight of a fusion-aid based on the weight of the copolymer may be used, 10 to 20% being preferably used.

When the fibers or films have been stretched longitudinally, the polymer molecules are at least partially oriented along the fiber axis or lengthwise of the film; and the extent of orientation depends on the degree of stretch. Heating such fibers or films very quickly causes shrinkage or retraction and loss of a great deal or all of the orientation at relatively low temperatures. By subjecting the stretched fibers or films to the cross-linking procedure of the present invention, the temperature at which substantial shrinkage of the fiber or film occurs is elevated substantially and the extent of shrinkage at a given elevated temperature, such as at 200° C. for example, is greatly reduced.

As stated previously, in order to provide structural products having increased strengths, it is necessary to stretch the products before effecting the crosslinking thereof. When aqueous copolymer dispersions are spun either by a wet-spinning or dry-spinning operation and a so-called "fuse-drying" stage is employed to effect complete coalescence of the particles into a continuous mass, it is generally desirable and, in most cases, essential that the fuse-drying, which is effected at relatively high temperatures of at least 30° C. above the $T_i$ value of the copolymer (such as from 60° to 400° C.), be effected before the cross-linking is effected.

The filaments, fibers, films, or threads, cords, and fabrics formed thereof may be subjected to other customery finishing processes, such as crimping, curling, twisting, sizing, softening, or lubricating to facilitate weaving, knitting, and other textile operations.

The filaments, threads, or yarns produced by the above described procedural steps are useful in the preparation of various types of fabrics. They are useful in fabrics where controlled shrinkage is desired as in filter cloths.

Uncrosslinked fibers or filaments of the present invention, and especially those formed from copolymers containing 0.5 to 30 mole percent of crosslinkable units, whether stretched or unstretched, may be converted into fabricated structures before the crosslinking is effected by the mild oxidation of the polymer; and then at some stage during or after the fabrication, the cross-linking may be performed upon the fabric. Fabricating procedures that may be employed include the formation of yarns by twisting together of continuous filaments or by the drafting and twisting of staple fibers formed of the polymers. Also included are plied yarns or cords obtained by doubling two or more of the twisted yarns obtained either from continuous filaments or staple fibers. Besides the yarns and cords, textile fabrics may be formed therefrom by weaving, braiding, or knitting of the yarns. Nonwoven fabrics are contemplated in which the fibers formed of the cross-linked polymers containing ion-exchange groups are distributed haphazardly to form a felt-like or paper-like structure either of low density or of compact structure. For example, such non-woven fabrics may be produced by carding the polymer fibers with or without additional fibers of textile-type or paper-making length, such as of woodpulp, cotton, silk, rayon, wool, linen, nylon, polyethylene terephthalate, and so on, and subsequently rendering some of the fibers in the products adhesive by heating. The fibers formed of polymers containing crosslinkable units may be relied on for adhesion, in which event the heating thereof in the fabricated structure, mat, woven or knitted textile, or the like to tacky condition may be followed by treatment with a crosslinking agent and heating to effect crosslinking and thereby impart reduced swelling, shrinkage, and obtain insolubilization and stabilization of the adhered fibers in the structure.

The filmy products are ion-exchanging resins in a special form adapting them to be applied in a wide variety of ways for the general purposes which are served by such resins including cation-exchange activity, catalytic activity, and other chemical functions including oxidative activity. They may be modified to enhance any of the particular activities.

In the examples, parts and percentages are by weight unless otherwise indicated:

*Example 1*

(a) To 200 parts of distilled water at room temperature is added 6 parts of an aqueous solution containing 2% of ferrous sulfate heptahydrate and 4% of the sodium salt of ethylenediaminotetraacetic acid adjusted to pH 4 with 0.5 N sulfuric acid solution. Then 3 parts of sodium laurate is added followed by 0.6 parts of sodium formaldehyde sulfoxylate.$2H_2O$. The pH of the solution is adjusted to 10.5 with 0.5 N NaOH. A mixture of 65 parts of acrylonitrile, 15 parts of butoxyethyl acrylate, 20 parts of methoxymethyl vinyl sulfide, and 20 parts of adiponitrile is added with stirring; and the air above the resulting emulsion is replaced by nitrogen. To the emulsifier is now added 0.15 part of phenylcyclohexane hydroperoxide as a 10% solution in toluene. After a short induction period, polymerization starts as evidenced by a sharp temperature rise. The temperature is now controlled by cooling to remain in the range 35° to 40° C. Over 85% conversion to a dispersion of five particle size (less than 0.1 micron in diameter) is achieved in about one-half hour after addition of the phenylcyclohexane hydroperoxide. The polymer contained in this dispersion has a $T_i$ of about 80° C.

The dispersion prepared as described above is pumped at a rate of 2.8 grams per minute through a spinneret into a coagulating bath. The spinneret consists of a platinum alloy. It has a face diameter of 0.5 inch and contains 40 holes each of 0.0025 inch diameter. The coagulating bath is an aqueous solution of 5% phosphoric acid which is maintained at 65° C. The bundle of filaments formed is drawn through the bath at a rate of 10 meters per minute. The immersion in the bath is 4 inches. The yarn is washed in water at 60° C. and then in 0.5% borax at 60° C. and dried in contact with a roll coated with polytetrafluoroethylene at 260° C. It is then passed over rolls revolving at different speeds to stretch the yarn about 600%. During this operation, the yarn is heated to about 130° C.

The stretched yarn is then soaked at constant length in aqueous 49% phosphoric acid for 30 minutes at 40° C. The yarn is then soaked for 10 minutes in an aqueous solution containing 0.04% NaOH and 1% iodine, the pH of which is adjusted to 9.0 with N/2 $H_2SO_4$, the temperature of this solution being 40° C. The yarn is then held at constant length and heated at 150° C. for one hour.

The yarn, which is now crosslinked in an oriented state, is then treated with 140 ml. per gram of a mixture of 50 parts of N/20 sodium hydroxide in water and 50 parts of ethanol at the refluxing temperature of the mixture for two days to hydrolyze some of its units to carboxylic groups. The resulting product is a carboxylic ion-exchange material in the form of a yarn, the filaments of which show orientation along the fiber axis and have a capacity for exchanging sodium of 3.2 meq. per gram.

(b) The procedure of part (a) is repeated except that 180 ml. per gram of yarn of the aqueous alcoholic sodium hydroxide hydrolysis medium is used (instead of 140). The cation-exchanging capacity of the resulting yarn is about 4.3 meq. per gram.

(c) The procedure of part (a) is repeated except that 240 ml. per gram of yarn of the aqueous alcoholic sodium hydroxide hydrolysis medium is used (instead of 140). The cation-exchanging capacity of the resulting yarn is about 5.7 meq. per gram.

(d) The procedure of part (a) is repeated except that 300 ml. per gram of yarn of the aqueous alcoholic sodium hydroxide hydrolysis medium is used (instead of 140). The cation-exchanging capacity of the resulting yarn is about 7.2 meq. per gram.

(e) The continuous filament yarns of parts (a) through (d) are cut to 1½-inch staple length, dispersed in an air stream by a blower, and then deposited on a screen to form a fibrous mat of 3-inch thickness adapted to be introduced in this form into the exchanger housing.

(f) The procedure of part (a) is repeated except the methoxymethyl vinyl sulfide is replaced with β-(methoxymethylthio)-ethyl methacrylate. Similar ion-exchange filaments are thereby obtained.

*Example 2*

A copolymer of 70% acrylonitrile, 25% ethyl acrylate, and 5% ureidopentyl vinyl ether is dissolved in dimethylformamide to form a 17% solution. The solution is raised to a temperature of 95° C. and extruded through a 40-hole spinneret (hole diameter of 0.005 inch) into a spinning bath consisting of glycerol heated to a temperature of about 135° C. The rate of extrusion at the spinneret is 12 meters per minute. The distance of immersion in the bath is 20 inches. The yarn after leaving the bath is stretched about 250% between rollers, washed free of glycerol with water, and dried. The yarn is then soaked in toluene-2,4,-diisocyanate at 25° C. for two minutes and heated at constant length at 70° C. for 40 hours. The cured yarn is hydrolyzed with a solution of NaOH in water and ethanol in a manner similar to that described in Example 1. The product has a capacity for exchanging sodium of about 3.1 meq. per gram.

In the same way, a fibrous cation-exchange material is obtained from a copolymer of 70% acrylonitrile, 25% methyl acrylate, and 5% of ureidoethyl methacrylate.

*Example 3*

In a way similar to that of Example 1(a), an aqueous dispersion containing a copolymer of 31 parts of ethyl acrylate, 59 parts of methyl methacrylate, and 10 parts of methoxymethyl vinyl sulfide is prepared. This is passed through a 40-hole spinneret at 2 grams per minute into an aqueous 30% sodium hydroxide solution at 70° C. The filaments are drawn from the spinneret at a rate of 6 meters per minute. The length of travel in the coagulating bath is 20 inches. The yarn is washed, soaked in 1% hydrochloric acid at room temperature for a few minutes, dried, and stretched about 100%. The stretched yarn is soaked in 4% hydrochloric acid (aqueous) at 40° C. for one hour, then in 5% iodine in ethyl alcohol for one hour at 40° C. The yarn is then cured with 5% relaxation at 100° C. for 6 hours. The cured yarn is treated with a mixture of 50 ml. of ethanol and 50 ml. of N/20 NaOH per gram of yarn at 40° C. for about three days. The resulting yarn has a cation-exchange capacity of about 2 meq. per gram.

*Example 4*

An aqueous dispersion is prepared with a redox catalyst and a non-ionic dispersing agent from a mixture of 45 parts of ethyl acrylate, 35 parts of acrylonitrile, and 20 parts of glycidyl methacrylate. The dispersion has a copolymer content of 40%. It is passed through a 40-hole platinum alloy spinneret with holes of 0.0025-inch diameter into an aqueous 30% sodium hydroxide solution at 80° C. The bundle of filaments is drawn through this solution a distance of 30 inches, washed with water at 40° C., passed through aqueous 10% acetic acid solution, fuse-dried in a 4-foot high tower heated at 250° C., and stretched at 150° C. about 150%.

The yarn is then soaked while relaxed in an aqueous 20% solution of hexamethylenediamine for 100 hours at 25° C. The soaked yarn is air-dried, heated at 80° C. at constant length for an hour, heated at 130° C. at constant length for an hour, thoroughly washed in aqueous 5% acetic acid solution at 25° C., washed with water, and air-dried.

The yarn is then treated at constant length with a mixture of 50 ml. of N/20 NaOH and 50 ml. of ethanol per gram of yarn at 60° C. for about two days. The resulting yarn has a cation-exchange capacity of about 2 meq. per gram.

*Example 5*

A dispersion of a copolymer of 60 parts of acrylonitrile and 40 parts of methyl acrylate is prepared by a procedure similar to that described in Example 1(a) except that only 10 parts of adiponitrile is added. The dispersion is concentrated to 55% polymer solids by evaporation at about 100 mm. Hg absolute pressure. The concentrated dispersion is forced at a rate of 7.0 meters per minute through a spinneret having 5 holes which are 0.0025 inch in diameter downward into a vertical tower through which nitrogen at 220° C. is passed. The filaments are collected at a rate of about 70 meters per minute and subjected to a temperature of 260° C. for a few seconds in order to assure complete fusion of the particles. The yarn is then treated with a solution comprising 50 parts of dimethylaminopropylamine and 50 parts of dodecane at 142° C. for one hour. The yarn is then stretched about 200% at about 120° C. and treated with 20% p-xylylene dichloride in toluene at 50° C. at constant length and cured at 150° C. at constant length for 30 minutes. The yarn is then soaked in a mixture of 60 ml. of N/20 NaOH and 60 ml. of ethanol per gram of yarn for about two days at 60° C. The resulting yarn has a cation-exchange capacity of about 2.5 meq. per gram.

*Example 6*

A copolymer of 65 parts of acrylonitrile, 25 parts of methyl acrylate, and 10 parts of hydroxypentyl vinyl ether is dissolved in dimethylformamide to form an 18% solution. The yarn is spun and treated as described in Example 2 to give a yarn with a cation-exchange capacity of 3.3 meq. per gram.

*Example 7*

(a) A synthetic latex comprising the copolymerization product of 80 parts of vinyl acetate and 20 parts of methoxymethyl vinyl sulfide is spun into an aqueous coagulating bath to form filaments which are stretched at 60° C. about 400%. The stretched filaments are soaked in a solution of 2% iodine in 6% aqueous potassium iodide also containing 4% $H_3PO_4$ at 20° C. for 1 hour. The excess solution is squeezed from the filaments which are then air dried and heated at 130° C. while being allowed to retract only slightly, for 2 hours in order to cause crosslinking of the oriented fibers. The filaments are then hydrolyzed by heating them in a relaxed state in an excess of 20% aqueous NaOH at 80° C. for 4 hours.

(b) One part by weight of the fibers obtained in (a) is heated in a mixture of 2.4 parts of 85% $H_3PO_4$ and 2.4 parts of urea at 150° C. for 20 minutes. The reaction gives the monoammonium salt of phosphoric acid groups attached to the main polymer chains.

(c) One part of the hydrolyzed filaments obtained in part (a) is reacted in a weight ratio of 1:10 (fiber to solution) with a solution comprising 25% NaOH, 10% β-chloroethyl sulfonate and 65% water to give the sulfethoxy product.

Example 8

An aqueous dispersion comprising 30% of a copolymer of 80% styrene and 20% methoxymethyl vinyl sulfide is spun to form a yarn by extrusion into an 18% hydrochloric acid bath at 85° C.; the yarn issuing from the spinneret (120-hole, 2.5 mil) is dried on a drum at 220° C. and stretched about 500%. The stretched (oriented) yarn is then soaked in an aqueous solution containing 2% iodine, 4% $H_3PO_4$ and 6% KI for several hours at 35° C. The yarn is then heated at constant length at 90° C. for about 1 hour and then at 130° C. for 2 hours. About 100 parts of the yarn is then washed in ethanol and reacted with a mixture of 53 parts $AlCl_3$, 200 parts chloromethyl ether and 100 parts of ethylene dichloride for 8 hours at 35° C. The yarn is then washed with ethyl alcohol and air dried. The yarn is then placed in a flask fitted with a thermometer, heater and reflux condenser connected to a Dry-Ice trap. About 360 parts of triethyl phosphite is added and the mixture is refluxed at 120° to 158° C. for about 5 hours. The yarn is then washed with ethanol followed by water. About 1300 parts of concentrated HCl is added and boiled in contact with the yarn for several hours. The product is washed with water. The resulting yarn has a total phosphonic acid capacity of about 5.5 meq./gram.

It is to be understood that changes and variations may be made without departing from the spirit and scope of the invention as defined in the appended claims.

We claim:

1. A process for making a fiber having at least one small dimension of the order of one-tenth to twenty mils comprising extruding, through an orifice of a spinneret into a coagulating medium, a water-insoluble linear addition copolymer containing (1) from one-half to 50 mole percent of cross-linkable units having glycidyl groups, and (2) at least 7 mol percent of units formed of at least one unsaturated acid derivative selected from the group consisting of the nitriles, amides, and esters of acrylic and methacrylic acids, heating the fiber at a temperature of 60° to 250° C., whereby the cross-linkable units form cross-links between molecules of the polymer while the polymer is maintained in fiber shape, and then hydrolyzing sufficient of the unsaturated acid derivative units to produce at least 7 mole percent of carboxylic cation-exchange groups in the polymer.

2. A process for making a fiber having at least one small dimension of the order of one-tenth to twenty mils comprising extruding, through an orifice of a spinneret into a coagulating medium, a water-insoluble linear addition copolymer of one-half to 50 mole percent of glycidyl methacrylate and at least 7 mole percent of units formed of at least one unsaturated acid derivative selected from the group consisting of the nitriles, amides, and esters of acrylic and methacrylic acids, heating the fiber at a temperature of 60° to 250° C., whereby the glycidyl units form cross-links between molecules of the polymer while the polymer is maintained in fiber shape, and then hydrolyzing sufficient of the unsaturated acid derivative units to produce at least 7 mole percent of carboxylic cation-exchange groups in the polymer.

3. A process for making a fiber having at least one small dimension of the order of one-tenth to twenty mils comprising extruding, through an orifice of a spinneret into a coagulating medium, a water-insoluble linear addition polymer containing from one-half to 50 mole percent of cross-linkable units having glycidyl groups and at least 7 mole percent of units formed of at least one unsaturated acid derivative selected from the group consisting of the nitriles, amides, and esters of acrylic and methacrylic acids, treating the fiber with a polyamine to cross-link the polymer through reaction of the polyamine with the glycidyl groups while maintaining the form of the fiber, and then hydrolyzing the polymer in an alkaline medium to introduce at least 7 mole percent of units containing carboxylic ion-exchange groups.

4. A process for making shaped filmy products having at least one small dimension of the order of one-tenth to twenty mils comprising extruding, through an orifice of a spinneret into a coagulating medium, a water-insoluble linear addition copolymer of a mixture containing (A) one-half to 50 mole percent of a member selected from the group consisting of alkoxymethyl vinyl sulfides, alkoxymethylthioethyl acrylates and alkoxymethylthioethyl methacrylates in which the alkoxy group has from 1 to 8 carbon atoms and (B) at least 7 mole percent of at least one unsaturated acid derivative selected from the group consisting of the nitriles, amides, and esters of acrylic and methacrylic acids, acidifying the shaped product, treating the acidified product with an oxidizing agent to effect cross-linking of the polymer molecules by the formation of disulfide linkages from the alkoxymethylthio units thereof, the acidification and treatment with an oxidizing agent being effected while maintaining the form of the fiber, and then hydrolyzing sufficient of the unsaturated acid derivative units to produce at least 7 mole percent of carboxylic cation-exchange groups in the polymer.

5. A process for making a fiber having at least one small dimension on the order of one-tenth to twenty mils comprising extruding, through an orifice of a spinneret into a coagulating medium, a water-insoluble linear addition copolymer of (A) one-half to 50 mole percent of alkoxymethyl vinyl sulfide and (B) at least 7 mole percent of at least one unsaturated acid derivative selected from the group consisting of the nitriles, amides, and esters of acrylic and methacrylic acids, acidifying the fiber, treating the acidified fiber with an oxidizing agent to effect cross-linking of the polymer molecules by the formation of disulfide linkages from the alkoxymethylthio units thereof, the acidification and treatment with an oxidizing agent being effected while maintaining the form of the fiber, and hydrolyzing sufficient of the unsaturated acid derivative units to produce at least 7 mole percent of carboxylic cation-exchange groups in the polymer.

6. A process for making a fiber having at least one small dimension of the order of one-tenth to twenty mils comprising extruding, through an orifice of a spinneret into a coagulating medium, a water-insoluble linear addition polymer containing from one-half to 50 mole percent of unreidoalkyl vinyl ether units and at least 7 mole percent of units formed of at least one unsaturated acid derivative selected from the group consisting of the nitriles, amides, and esters of acrylic and methacrylic acids, treating the fiber with a polyisocyanate to cross-link the polymer through the ureido units while maintaining the form of the fiber, and then hydrolyzing the polymer in an alkaline medium to introduce at least 7 mole percent of units containing carboxylic ion-exchange groups.

7. A process for making a fiber having at least one small dimension of the order of one-tenth to twenty mils comprising extruding, through an orifice of a spinneret into a coagulating medium, a water-insoluble linear addition polymer containing from one-half to 50 mole percent of hydroxyalkyl vinyl ether units and at least 7 mole percent of units formed of at least one unsaturated acid derivative selected from the group consisting of the nitriles, amides, and esters of acrylic and methacrylic acids, treating the fiber with a polyisocyanate to cross-link the polymer through the hydroxy units while maintaining the form of the fiber, and then hydrolyzing the polymer in an alkaline medium to introduce at least 7 mole percent of units containing carboxylic ion-exchange groups.

8. A process for making a filmy product having at least one small dimension of the order of one-tenth to twenty mils comprising extruding, through an orifice of a spinneret into a coagulating medium, a water-insoluble linear addition polymer containing (1) from one-half to 50 mole percent of cross-linkable units containing reactive groups selected from the group consisting of carboxyl, hydroxyl, amido, amino, epoxy, isocyanato, ureido, and alkoxymethylthio groups, and (2) at least 7 mole percent of hydrolyzable units selected from the group consisting of those formed of acrylonitrile, acrylamide, methyl acrylate, and ethyl acrylate, coalescing the extruded polymer to form a filmy product, then reacting the cross-linkable units with a member selected from the group consisting of themselves and polyfunctional compounds to form cross-links between molecules of the polymers in the coalesced product while maintaining the form of the polymer product, and then hydrolyzing at least 7 mole percent of the hydrolyzable units to introduce carboxylic groups into the polymer.

9. A process for making a fiber having at least one small dimension of the order of one-tenth to twenty mils comprising extruding, through an orifice of a spinneret into a coagulating medium, a water-insoluble linear addition polymer containing (1) from one-half to 50 mole percent of cross-linkable units containing reactive groups selected from the group consisting of carboxyl, hydroxyl, amido, amino, epoxy, isocyanato, ureido, and alkoxymethylthio groups, and (2) at least 7 mole percent of hydrolyzable units selected from the group consisting of those formed of acrylonitrile, acrylamide, methyl acrylate, and ethyl acrylate, stretching the shaped article, then reacting the cross-linkable units with a member selected from the group consisting of themselves and polyfunctional compounds to form cross-links between molecules of the polymers while maintaining the form of the fiber, and then hydrolyzing at least 7 mole percent of the hydrolyzable units to introduce carboxylic groups into the polymer.

References Cited in the file of this patent
UNITED STATES PATENTS

| | | |
|---|---|---|
| 2,327,872 | Dahle | Aug. 24, 1943 |
| 2,730,768 | Clarke | Jan. 17, 1956 |
| 2,805,196 | Gerhordus | Sept. 3, 1957 |